United States Patent [19]

Assaf

[11] 4,440,148
[45] Apr. 3, 1984

[54] METHOD OF AND MEANS FOR MAINTAINING A HALOCLINE IN AN OPEN BODY OF SALT WATER

[75] Inventor: Gad Assaf, Rehovot, Israel

[73] Assignee: Solmat Systems Ltd., Yavne, Israel

[21] Appl. No.: 134,658

[22] Filed: Mar. 27, 1980

[51] Int. Cl.³ .............................................. F24J 3/02
[52] U.S. Cl. .................................. 126/415; 126/400; 165/1; 165/45
[58] Field of Search .................... 126/415, 435, 400; 165/1, 45

[56] References Cited

U.S. PATENT DOCUMENTS

| | | | |
|---|---|---|---|
| 3,372,691 | 3/1968 | Shachar | 126/452 X |
| 3,805,515 | 4/1974 | Zener | |
| 4,014,279 | 3/1977 | Pearson | |
| 4,063,419 | 12/1977 | Garrett | 126/435 X |
| 4,110,172 | 8/1978 | Spears, Jr. | 126/901 X |
| 4,121,567 | 10/1978 | Carson | 126/415 |
| 4,138,992 | 12/1979 | Shaffer | 126/415 |
| 4,172,766 | 10/1979 | Laing et al. | 126/424 X |
| 4,244,351 | 1/1981 | Loeb et al. | 126/415 |
| 4,249,518 | 2/1981 | Holt | 126/415 |
| 4,283,913 | 8/1981 | Loeb | 126/415 X |

OTHER PUBLICATIONS

An Article in *Solar Energy*, vol. 18, pp. 293–299, entitled "The Dead Sea: A scheme for a Solar Lake," by Gad ASSAF.

*Primary Examiner*—Larry Jones
*Attorney, Agent, or Firm*—Sandler & Greenblum

[57] ABSTRACT

A halocline is maintained in open body of salt water at a depth to which a significant amount of solar radiation penetrates by inducing an upward vertical flow in the body of water sufficient to counter wind-mixing and molecular diffusion thereby establishing an ascending or rising solar lake. The upward flow is induced by injecting into the body of water a concentrate with a density greater than the density of liquid at the lower end of the halocline, the concentrate being formed by evaporating liquid drawn from the surface of the body of water. The halocline suppresses convention currents and allows solar radiation to heat the halocline as well as a layer of liquid therebelow to temperatures significantly higher than the surface temperature. Heat for useful work can be extracted from the heat storage layer beneath the halocline.

In a modification, the linearity of the halocline and its consequent stability are controlled by inducing a downward vertical flow simultaneously with and equal to the upward flow thereby establishing what is termed a standing solar lake. The downward flow is induced by flash evaporating liquid drawn from the heat storage layer.

36 Claims, 9 Drawing Figures

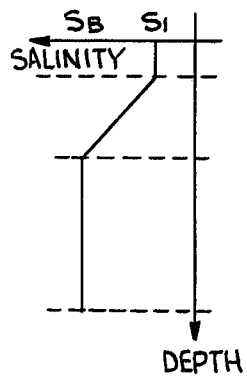
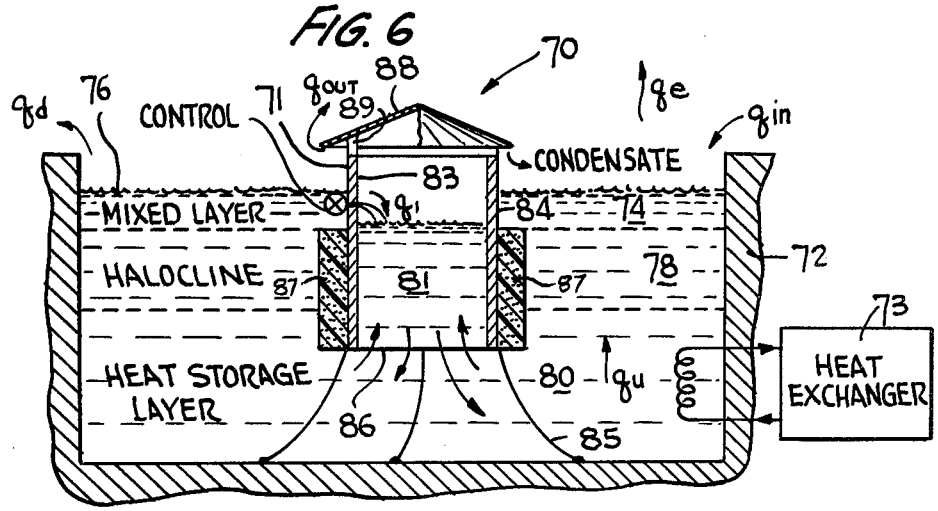
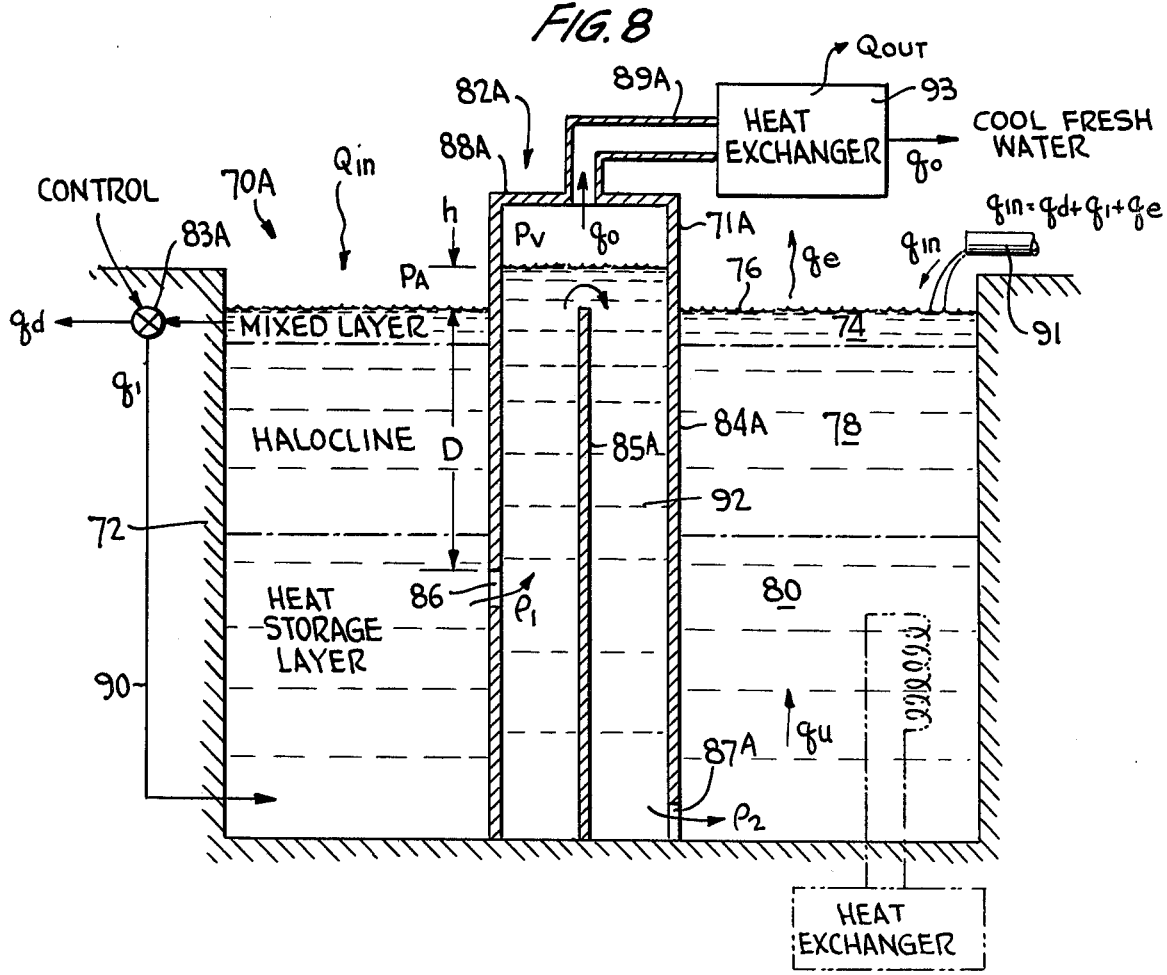

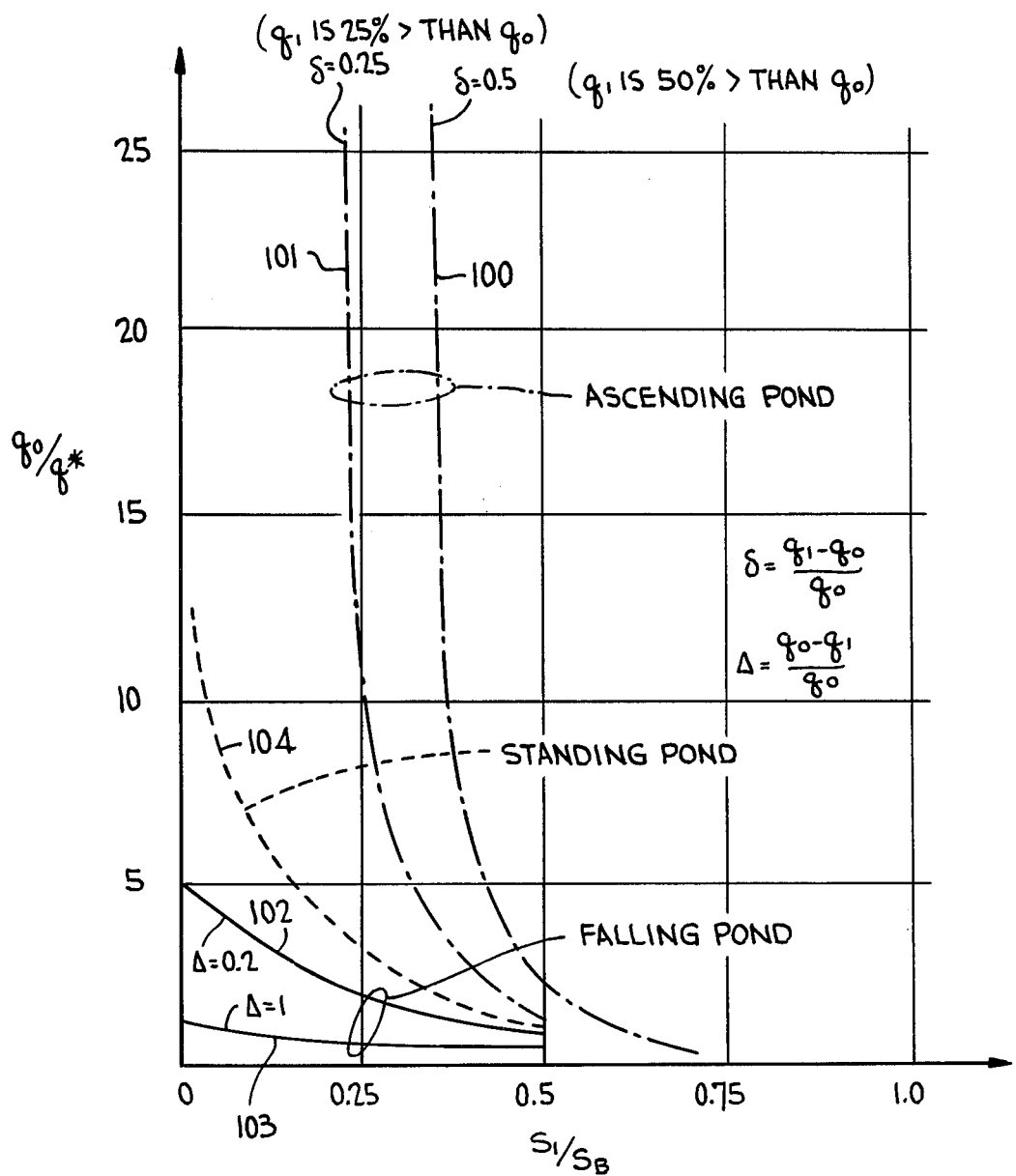

METHOD OF AND MEANS FOR MAINTAINING A HALOCLINE IN AN OPEN BODY OF SALT WATER

BACKGROUND OF THE INVENTION

This invention relates to a method of and means for maintaining a halocine in an open body of salt water.

A halocline is a zone in a body of salt water wherein a marked salinity gradient is present, the gradient being such that salinity increases with depth. As is well known, convection currents within a halocline are suppressed by the difference in vertical density. As a consequence, the presence of a halocline adjacent a surface of a body of water at a depth to which solar radiation penetrates (i.e., 1–3 meters) is accompanied by heating of the halocline and a layer of liquid therebeneath to temperatures significantly higher than the surface temperature of the body of water. In the absence of the halocline, heat absorbed below the surface of the body of water would be transferred by convection currents to the surface of the water where it would be dissipated by evaporation and long-wave radiation. Thus, a stable halocline in a shallow pond converts the pond into a solar collector permitting temperatures as high as 100° C. to be obtained at a depth of about one meter below the surface.

The ability of a shallow pond to act as a solar collector depends upon the stability of the halocline. Factors tending to destabilize a pond are molecular diffusion of salt along the concentration gradient, mixing of the upper layer of liquid due to wind action at the surface, and induced convection associated with heat extraction at the bottom of the pond.

An initial approach to maintaining stratification and stabilizing the halocline is disclosed in Israeli Patent No. 12561 of May 25, 1959. This patent discloses a system for continuously flushing the surface of a solar pond with fresh water and adding salt at the bottom. In order for this technique to be successful, a source of fresh water is required and the pond is not self-maintained in the sense that it requires intercession for outside the system to maintain the halocline.

A self-maintaining solar pond is disclosed in U.S. Pat. No. 3,372,691 of Mar. 12, 1968 wherein a downward vertical motion across the halocline is induced by flash evaporating liquid drawn from a heated layer of liquid below the halocline to obtain fresh water and a solution whose concentration exceeds that of the heated layer liquid. Some of the concentrated solution is returned to the heated layer of liquid, and make-up water to maintain the level of the pond is added at its surface. A solar collector operating on this principal is termed a descending or falling solar pond because of the downward motion across the halocline. Such motion can be ajusted, in theory, to counter the diffusion flux of salt in the pond by controlling the rate at which flash evaporation takes place.

It can be shown analytically that as the downward motion across the halocline increases, the slope of the halocline in its upper region (i.e., near the surface of the pond), becomes quite large, and in fact, the salinity profile is asympotic to the vertical near the surface. As a consequence, the salt gradient near the top of the halocline will be very small and hence highly unstable when heated by more than a few degrees. Furthermore, wind mixing near the surface will completely destroy small salt gradients.

The situation in the upper portion of the halocline can be improved if most of the fresh water produced by the flash evaporator is returned to the pond. However, in arid zones, fresh water is scarce and its use in this manner is wasteful. Moreover, brackish or sea water is often available as make-up water to compensate for evaporation, but the salt from such water will slowly accumulate and eventually destroy the stratification. In order to maintain the balance, downward movement across the halocline can be increased to not only compensate for molecular diffusion, but to bring salt to the bottom of the pond where it is available for crystalization from the flash evaporator. It can be shown that as the salinity of the make-up water increases, an even greater vertical movement is needed, and such greater vertical movement further reduces the already small gradint in the upper half of the halocline. As a consequence, the pond under these conditions will be very unstable against wind mixing and induced mixing due to circulation associated with heat extraction.

It is therefore an object of this invention to provide a new and improved method of and means for maintaining a halocline in an open body of water wherein the disadvantages of the prior art, as outlined above, are reduced or substantially overcome.

SUMMARY OF INVENTION

In accordance with the present invention, a halocline in an open body of water is maintained by inducing an upward vertical flow sufficient to counter wind-mixing and molecular diffusion thereby establishing an ascending or rising solar pond. The upward flow is induced by injecting into the body of water a concentrate with a density greater than the density of liquid at the lower end of the halocline, the concentrate being formed by evaporating liquid drawn from the surface of the body of the water. The halocline suppresses vertical convection currents and its location near the surface of the body of water enables solar radiation to heat the halocline and the layer of liquid therebelow to temperatures significantly higher than the surface temperature. Heat for useful work can be extracted from the heated layer.

In a second embodiment of the invention, the linearity of the halocline and its consequent stabilization are controlled by inducing a downward vertical flow simultaneously with, and equal to, the upward flow thereby establishing what is termed a standing solar pond. The downward flow is induced by flash evaporating liquid drawn from the heat storage layer.

BRIEF DESCRIPTION OF DRAWINGS

Embodiments of the invention are shown in the attached drawings to which reference is now made:

FIG. 6 is a vertical section taken through a solar pond showing a control chamber that functions to maintain the gradient without the necessity of an evaporating pond;

FIG. 7 is the salinity profile of the pond;

FIG. 8 is a vertical section taken through a solar pond showing a flash evaporator that eliminates the need for pumps to transfer brine;

FIG. 9 is a graph showing the heat extraction capabilities for a standing, ascending and a decending solar pond.

DESCRIPTION OF PREFERRED EMBODIMENTS

Figures 1, 2:
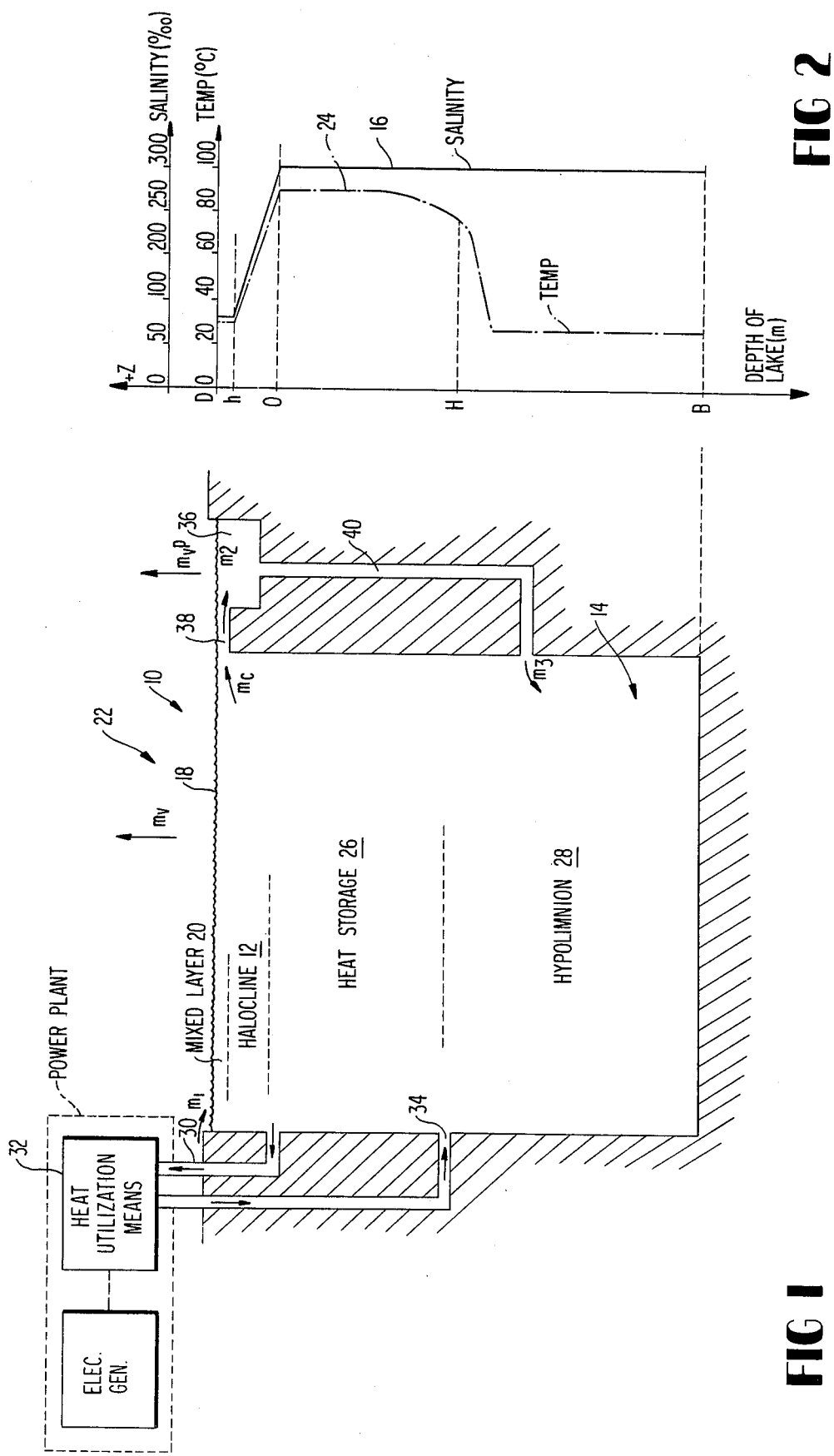
FIG. 1 is a vertical section taken through an ascending solar lake in accordance with the present invention.
FIG. 2 is a graph showing the salinity and temperature profiles through a vertical section of the lake.

Referring now to FIG. 1, reference numeral 10 designates an ascending or rising solar lake according to the present invention wherein halocline 12 in open body 14 of relatively deep salt water is maintained by inducing an upward vertical flow through the halocline. The vertical alinity distribution through the body 14 is shown at 16 in FIG. 2. If the origin of the vertical axis is taken at the depth of the lower end of the halocline, the latter is a layer of thickness h located below a layer of thickness D-h defining surface 18 and constituting a mixed layer 20 whose salinity is relatively low and substantially uniform due to wind mixing. Within the halocline, the salinity increases sharply with depth as shown in FIG. 2; and deeper than the halocline, the salinity is substantially constant with depth. Quantatively, the distance D, is from one to three meters and the distance D-h, will be about 30 cm, wind breaks shown in FIG. 5 being floated on surface 18 to insure the situation.

Solar radiation 22 incident on surface 18 will penetrate and be absorbed in both the mixed layer 20 and the halocline. By reason of wind-mixing in the mixed layer, heat absorbed in this layer will be dissipated quickly at the surface thereby maintaining a relatively low temperature as compared to the temperatures in the halocline wherein convection currents are suppressed. As a consequence, the halocline will be heated to temperatures substantially greater than the temperature above the halocline as indicated in temperature profile 24 shown in FIG. 2. If the halocline is established over a period of time, the liquid below the halocline will be heated by conduction and convection currents therein to establish a heat-storage layer 26. In the hypolimnion 28 below layer 26, the temperature will be considerably lower as indicated in FIG. 2.

In the preferred form of the embodiment shown in FIG. 1, liquid from the upper region of layer 26 is drawn through inlet conduit 30 into heat utilization means 32 (e.g., a heat exchanger) which extracts heat for useful purposes (e.g., driving a turbine which drives an electric generator). After the heat is extracted, the cooled liquid is discharged through conduit 34 into the lower portion of layer 26. The thickness of the heat storage layer is thus dependent on the location of heat extraction discharge (34). In alternative forms of the invention, the heat utilization means can be in the form of a series of heat exchangers directly immersed in heat-storage layer 26.

Solar lake 10 includes a relatively shallow evaporation pond 36 adjacent body 14 and interconnected therewith by a channel shown schematically at 38 which allows surface liquid from body 14 to be drawn into the pond and permits circulation to occur between body 14 an the pond through conduit 40. Evaporation from pond 36 takes place due to climatic conditions of humidity and solar radiation providing a concentrate in the pond whose density will exceed the density of the liquid in body 14 below the halocline. The concentrate will flow through conduit 40 and into the body 14 below the halocline. The circulation thus established causes an upwelling in the body 14 that stabilizes the halocline against both wind-mixing and molecular diffusion of salt across the halocline.

To maintain the surface 18 at a substantially constant level against evaporation from both this surface and pond 36, replacement liquid must be added. In arid climates, little rain will be available for make-up water and fresh water will be a premium. Therefore, since brackish or sea water will usually be available as make-up water, the added salts present in the make-up water can be recovered as solids in the evaporation pond.

The mechanism for establishing and maintaining the halocline in a large body of water is applicable to artificial lakes as well as to certain natural bodies of water. It is discussed below, for illustrative purposes only, with reference to a proposal for converting the Dead Sea into an ascending solar lake. The material that follows is based on an article, which is hereby incorporated by reference, published in *Solar Energy*, Vol. 18, pp. 293-299, Pergamon Press, entitled "The Dead Sea: A Scheme for a Solar Lake" by the present inventor. The principles are also applicable, however, to other bodies of water lying in arid climates, as for example, the Great Salt Lake, the Quantara Depression, and the Gulf of Suez. As applied to the Dead Sea, body 14 represents the relatively deep northern basin of the Sea with an area of 720 Km$^2$, and pond 36 represents the relatively shallow southern basin with an area of 230 Km$^2$. Conduit 38 represents the Lisan Straits that interconnect the two basins.

At the present time, evaporation ponds associated with the southern basic currently draw a flux $m_c$ and produce halite precipitates. These ponds will be flushed with relatively fresh water ($m_2$ in FIG. 1 having a salinity $S_2$) and become dissolving ponds. The brine discharge from the halite production will mix with the discharge from the dissolving ponds providing the flow $m_3$ in FIG. 1 whose density will exceed the density of the liquid in body 14. In FIG. 1, $m_1$ represents the mass flow of make-up water of salinity $S_1$ and $Mv^P$ represent the mass flow of fresh water evaporated from the body and from the pond respectively.

The parameters by which the halocline can be stabilized are discussed below. First of all, the depth D of the halocline should be minimized in order to locate the halocline as close to the surface as is practical in order to maximize the amount of heat converted from solar radiation. The parameter that minimizes D will determine the upwelling rate and the circulation required to establish such rate. Finally, the resultant upwelling rate must be sufficient to overcome molecular diffusion in order to provide stability to the halocline.

It can be shown that the depth of the halocline is directly proportional to Cu, the rate at which wind introduces available energy for mixing, and inversely related to the quantity:

$$S_2(\rho_0-\rho_2)/(S_0-S_2)$$

where $\rho_0$ and $\rho_2$ are the densities of liquid at depth D and on the surface respectively, and $S_0$ and $S_2$ are the salinities (in percent) at the same locations. Obviously, Cu (which depends on the cube of the wind speed) can be minimized by providing floating wind breaks as described below. This will also minimize the thickness of the mixed layer 20 whih is given by the value D-h.

The other quantity upon which D depends must be maximized in order to minimize D. From consideration of stability of liquids involved, this quantity cannot grow beyond bounds; and for Dead Sea water, the quantity is maximized when the surface salinity $S_2=15\%$.

It can be shown from kinematic analysis that the upwelling rate W is given by:

$$W = \frac{EA_p}{\rho_0 A_0} \times \frac{S_2}{(S_c - S_2)} = \frac{m_3 - m_c}{A_0 \rho_0} \quad (1)$$

where E is the evaporation rate of pond 36, $A_p$ is its area, $A_0'$ is the area of body 14 at the level of the halocline (i.e., Z=0), $\rho_0$ is the density at this level, and $S_c$ is the salinity of the flux $m_c$. Thus from equation (1), both the upwelling rate and the circulation can be determined from the known parametrs.

In order for the halocline to be stabilized against molecular diffusion, the upwelling rate must exceed a threshold value which can be determined from the equation representing a steady state salt flux F across the halocline due to molecular diffusion:

$$WS - KS' = F/\rho \quad (2)$$

where W is the upwellin rate (i.e., the upward velocity of water in body 14), S is the salinity, K is the salt diffusivity, S' is the vertical rate of changeof salinity, and $\rho$ is density.

Integration of equation (2) from Z=0 TO Z=h (see FIG. 1) and along the halocline yields:

$$S(Z) = S_0 + [S_h - S_0][1 - \exp(WZ/K)]/[1 - \exp(Wh/K)] \quad (3)$$

where S(Z) is the salinity within the halocline at point Z above the bottom of the halocline, $S_0$ is the salinity at the bottom of the halocline, and $S_h$ is the salinity at the top of the halocline.

Figure 4:
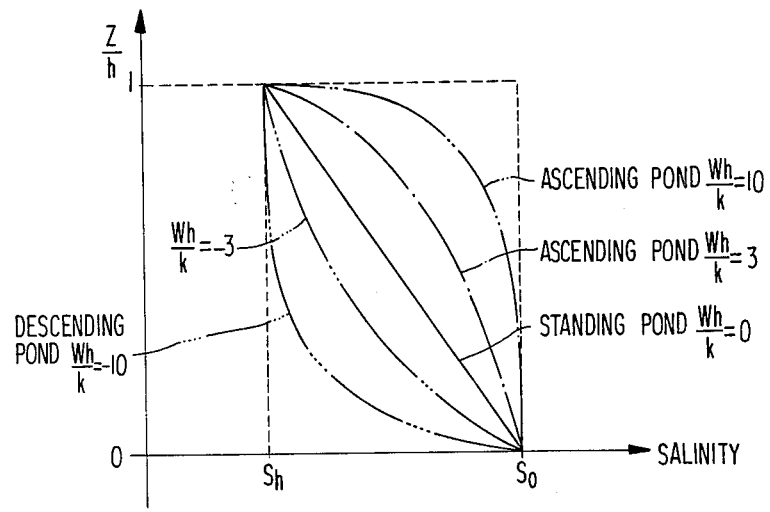
FIG. 4 is a graph showing the variation in salinity in a halocline for a standing, an ascending, and a descending pond.

Referring now to FIG. 4, Equation (3) has been plotted in normalized fashion for various values of (Wh)/K. As can be seen, the profile of the salinity of the halocline will be nonlinear and will bulge upwardly of an ascending pond. For stability reasons it would be desirable to have (Wh)/K less than three since this condition would cause the profile to approach linearity.

FIG. 4 also shows the salinity profile in the halocline for a descending solar pond of the type disclosed in U.S. Pat. No. 3,372,691. From inspection of FIG. 4 can be seen that the superposition of an ascending solar pond on a descending solar pond should permit the establishment of a linear salinity profile in the halocline which is a situation that results from a net flow of zero. This can be achieved in the manner shown in FIG. 3 to which reference is now made.

Figure 3:
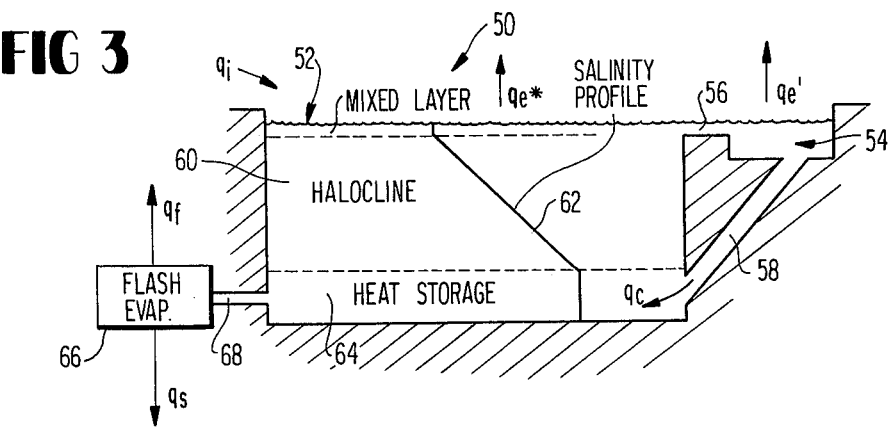
FIG. 3 is a vertical section taken through a standing solar lake in accordance with the present invention.

In FIG. 3, reference 50 designates a standing solar pond according to the present invention which comprises a main pond 52 about two meters deep and a shallower evaporation pond 54. The main and evaporation ponds are interconnected by a conduit 56 such that the surface waters of the main pond can flow into the evaporation pond which is connected by conduit 58 to a region of the main pond below the halocline 60. By the process described in connection with the first embodiment, halocline 60 is established with a salinity profile indicated at 62. Below the halocline is a heat storage layer 64 to which flash evaporator 66 is connected by conduit 68.

In operation, surface water in pond 52 is drawn into pond 54 where evaporation takes place producing a concentrate which flows through conduit 58 into the bottom of pond 52 producing an upwelling in the manner described above in connection with the first embodiment of the invention. Liquid from the heat storage zone is drawn into the flash evaporator which produces a precipitate of salt and fresh water. The effect of the flash evaporator is to induce a descending motion in the main pond which cancels the ascending motion due to the injection of the concentrate from pond 54. As a consequence, the profile of the salinity in the halocline is linear as indicated.

From considerations of the conservation of volume and mass in the standing solar pond shown in FIG. 3, it can be shown that the density ... of the concentrate required to establish the standing solar pond is as follows:

$$\rho_c = \frac{[\rho_s(q_e + q_f)]\sigma_i/(\sigma_s - \sigma_i) + q_f \rho_f + KA\Delta\rho/h}{(q_e + q_f)\sigma_i/(\sigma_s - \sigma_i) + q_f} \quad (4)$$

where the symbol "q" represents a volume transport (m³/sec), the symbol "$\rho$" represents density and "$\sigma$" the density anomaly ($\sigma = \rho - 1000$) in (kg/m³), the subscript "e" represents an index of evaporation, the symbol "i" represents an index of the in-flow to the pond, and the index "f" represents an index of the fresh water output and "s" the salt output of the flash evaporator. In addition, $\Delta\rho = -(\rho_h - \rho_0)$, and h is the depth of the halocline, K is the salt diffusivity, and A is the area of the main pond, it being assumed that the area of the evaporator pond 54 is substantially smaller than the area of the main pond.

Figure 5:
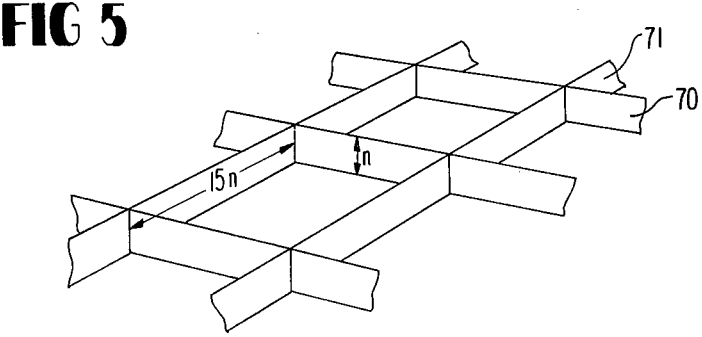
FIG. 5 is a perspective view of a wind break usable on the surface of a standing or ascending solar lake.

Referring now to FIG. 5, a wind break suitable for use with either embodiment of the invention is shown. The wind break comprises a plurality of members 60 running longitudinally and a plurality of members 61 running transversely and interconnected at their junctions. The height of the wind break is n and the spacing between the wind breaks is 15n. If the wind break has a porosity of 40%, the wind speed at the surface can be reduced to about ⅓ within the distance 15n.

The provision of a wind break on the main pond to reduce wind mixing will be advantageous when a layer of material is provided on the pond surface to reduce evaporation. As is well known, the deposition on an area body of water of a monomolecular layer will significantly reduce evaporation. Many materials can be used, as for example HEXADECANOL. The problem with using a monomolecular layer to retard evaporation is its susceptability to being removed from the central region of the pond by wind action. That is to say, the wind tends to blow the evaporation retardant toward the periphery of the pond thus exposing the central portion of the pond to evaporation. By providing a wind break, dispersing of the evaporation retardant is resisted and the retardant is thus considerably more effective than would be the case were the retardant used without a wind break.

A deep solar lake (i.e., one of depth greater than 10 m) is advantageous because the hypolimnion can be utilized as a heat sink into which heat from the power plant can be rejected. That is to say, the hypolimnion can act as a condenser for the exhaust of a heat engine operating heat extracted from the heat storage layer. When this occurs, it will usually be necessary to remove some heat from the hypolimnion. A particularly simple arrangement to achieve this end is to pump water from the hypolimnion into the evaporation ponds. Because such ponds are relatively shallow, their surface temperature will be in thermal equilibrium with the atmosphere. Consequently, the heated, but relatively dense, water from the hypolimnion will be cooled in the evaporation ponds and be available for return to the solar lake as even denser "deep water" that induces upwelling. Thus, the evaporation pond will serve as a means for disposing of waste heat as well as a source of "deep water".

The amount of water from the hypolimnion that must be cooled to maintain equilibrium conditions will not be large. For example, in the Dead Sea, the equilibrium temperature of the Southern Basin is about 17 C. in the winter and about 35° C. in the summer. If deep water from the Northern Basin is used for cooling a power station; and if the temperature of the deep water transferred from the Northern Basin to the Southern Basin is 25° C., it will be cooled in winter at the rate of 400 watts/m².

The above discussion deals with processes that automatically maintain a halocline in a solar pond against salt diffusion and wind mixing by evaporating surface water from the solar pond to a density greater than the density in the heat storage layer below the halocline and allowing the denser water to flow into the heat storage layer at a rate which produces an ascending solar pond. Given a predetermined functional relationship between the salinity in the halocline and depth, the process described above will maintain this relationship over a long period of time. Using an indirect heat exhanger, heat can be extracted from the heat storage layer at the same average rate at which the heat storage layer absorbs heat from the halocline. For example, in the geographic area in the vicinity of the Gulf of Eilat, the heat flux from solar radiation is about 250 watts/m² day and night, the year round. A solar pond is about 20% efficient, so that the heat flux into the heat storage layer of a solar pond in this vicinity will be about 50 watts/m². If this amount of heat were extracted from the pond, in terms of the latent heat of water, then the pond could furnish water at a rate of about 1.8 Kg/day/m², which is equivalent to evaporating a layer of water about 1.8 mm deep. While more heat can be extracted from a solar pond over a short period of time when the pond operates intermittently, the heat flux into the heat storage layer represents the steady state rate at which heat can be extracted from the heat storage layer 24 hours per day indefinitely, provided only that a mechanism exists for maintaining the predetermined functional relationship between the salinity and the depth of the halocline.

In addition to the techniques described above, the present invention includes other techniques suitable for solar ponds where an auxiliary evaporating pond is not convenient as, for example, in humid areas. FIG. 6 represents one such technique wherein reference numeral 70 designates a solar pond according to the present invention into which control chamber 71 is incorporated for automatically maintaining the stability of the halocline. Pond 70 includes the usual basin 72 for containing the pond which includes top mixed layer 74 adjacent surface 76 of the pond, halocline 78 just below the mixed layer, and heat storage layer 80 below the halocline. The salinity profile of the water in pond 70 outside the control chamber is shown in FIG. 7, the salinity of the mixed layer being designated $S_1$, and the salinity of the heat storage layer, and at the bottom of the halocline, being designated $S_B$.

Chamber 71 defines local region 82 which functions to evaporate water from the pond, thereby increasing the salinity in the region. Specifically, chamber 71 includes tube 84 vertically positioned in the pond, the lower end of the tube being open at 86 at an elevation below the halocline. The upper end of the tube is closed by cap 88 and a vent 89 in the closed end of the tube provides an exit passage for water that evaporates from inside the tube. An optional way of mounting the tube in the solar pond is indicated in FIG. 6 and includes floats 87 surrounding the tube such that the tube floats in the pond with cap 88 and vent 89 being located above the surface 76 of the pond. Cables 85 are used to moor the tube in the pond.

Float 87, which is annular, surrounds the lower portion of the tube and provides for insulating the water in the tube as well as bouyancy for the tube.

In operation, water column 81 inside the control chamber is substantially at the temperature of the heat storage layer and is thus warmer than the surface waters of the pond. Furthermore, the water inside the control chamber is more dense than the water in the halocline, with the result that the surface of the water in the control chamber is somewhat lower than the surface of the water in the pond. By reason of the temperature of the water in the control chamber and climatic conditions, surface water in column 81 will evaporate and perhaps condense inside cap 88, where it will roll down the inclined sides and exit through openings 89 dripping into the pond outside the control chamber. The evaporation of water in column 81 the control chamber is accompanied by an increase in salinity and hence density of the water in column 81 relative to the density of the water in the heat storage layer. As a consequence, a natural flow of water into and out of the control chamber is set up in the manner shown by the arrows in FIG. 6. Specifically, relatively lighter water from the heat storage layer flows upwardly into column 81 in an annular region of opening 86, and relatively denser water in the column flows downwardly through the central region of the opening.

The walls of tube 84 may be apertured in the region of the mixed layer for the purpose of adding surface water to the interior of the tube in accordance with adjustable control 83.

In general, the mass and salt balance is maintained by inputting water at a rate $q_{in}$ and discharging water at a rate $q_d$. Water evaporates from the pond at the rate $q_e$ while water vapor escapes from the control chamber in the amount of $q_{out}$. Water at the rate of $q_1$ from the surface is admitted to the interior of the control chamber. Finally, water at the rate $q_u$ flows upwardly through the heat storage layer.

By considerations relating to the conservation of volume and salt in the bottom layer of the pond, the bottom layer balance is as follows:

$$q_u + q_{out} = q_1 \tag{5}$$

$$S_B q_u - (K/h)(S_1 - S_B) = q_1 S_1 \tag{6}$$

These equations can be solved to yield:

$$q_{out} = [(S_b - S_1)/S_B][q_1 + q^*] \quad (7)$$

where $q^* = K/h$, K is the diffusivity of salt, and h is the depth of the halocline.

Eq. (7) is based on the assumption that the quantity K is constant in the halocline and that the halocline is linear. These are reasonably accurate assumptions and will yield realistic results.

It should be noted that the quantities q is expressed in velocity units related to the area of the pond. For example, the quantity $q^*$ for a halocline of 1 m is approximately 0.2 mm/day.

Three different regimes can arise depending upon the relationship between the quantity $q_1$ and the quantity $q_{out}$, namely, an ascending pond, a falling pond and a standing pond. As ascending pond is achieved when $q_1$ is greater than $q_{out}$; a falling pond, when $q_{out}$ is greater than $q_1$; and a standing pond results when $q_{out} = q_1$.

Considering first an ascending pond wherein the amount of water fed into the interior of the control chamber exceeds the amount of water evaporated from the control chamber, the relationship between these two quantities may be expressed as $q_1 = (1 + \delta)q_0$. When this relationship is substituted into Eq. (7), the relationship between the amount of water evaporated and the quantity $q^*$ is as follows:

$$q_0/q^* = [1 - S_1/S_B]/[(S_1/S_B)(1 + \delta) - \delta] \quad (8)$$

Eq. (8) is plotted for two parameters in FIG. 9, curve 100 representing the solution of Eq. (8) when the surface water added to the interior of the control chamber exceeds the water evaporated from the control chamber by 50% while curve 101 represents the situation when the excess water added is 25% of the water evaporated.

For a falling pond, the amount of water evaporated from the control chamber will exceed the amount of water which enters the control chamber through control 83. The relationship between these two quantities can be expressed as $q_1 = (1 - \Delta) q_1$ and, in such case, Eq. (7) can be rewritten as follows:

$$q_0/q^* = \{[1 - (S_1/S_B)]q^*\}/[(S_1/S_B)(1 - \Delta) + \Delta] \quad (9)$$

Eq. (9) is also plotted in FIG. 9 wherein curve 102 represents a falling pond in which 20% more water is evaporated than is added to the control chamber; and curve 103 represents a falling pond in which the difference is 10%.

For a standing pond, the amount of water added to the control chamber is exactly equal to the amount of water evaporated from the control chamber. The equation for describing the relationship between the water evaporated and the quantity $q^*$ can be obtained from Eq. (9) by setting the quantity $\Delta$ equal to zero. Curve 104 in FIG. 9 shows the relationship for a standing pond.

In addition to the mass balance given above, consideration must also be given to the balance of the pond as a whole. Considering the volume and salt balance of the pond as a whole yields the following equations:

$$q_{in} = q_e + q_{out} + q_d \quad (10)$$

$$q_{in} S_{in} = q_d S_d \quad (11)$$

where $q_{in}$ is the rate at which water is added to the surface of the pond, $q_e$ is the excess of water evaporated from the pond over precipitation into the pond, $q_d$ is the discharge of salty water from the pond, $S_{in}$ is the salinity of the makeup water, and $S_d$ is the salinity of the water removed from the pond.

If it is assumed that the discharge takes place at the surface of the pond, then $S_d = S_{in}$. Basically, $q_e$ is determined by climatic conditions, and $q_{out}$ is determined by climatic conditions and design considerations of the control chamber. Furthermore, $S_{in}$ is determined by the water resources available so that Eqs. (10) and (11) contain two unknowns which can be solved for. Thus, the makeup water is as follows:

$$q_{in} = (q_e + q_{out})[S_d/(S_d - S_{in})] \quad (12)$$

For $S_{in} = $ zero, which is to say that fresh water is added, $q_{in} = q_e + q_{out}$ and $q_1 = $ zero. Assuming that $S_{in} = 0.1$, while the salinity of the surface water $S_1 = 0.2$, then $q_{in} = 2 (q_e + q_{out})$ and $q_0 = \frac{1}{2}q_1$.

From the above, it can be seen that the control chamber shown in FIG. 6 provides a convenient and relatively simple way in which to maintain the halocline in a solar pond in any of the configurations shown in FIG. 4. Furthermore, the arrangement described above, by reason of the control 83, permits the nature of the halocline to be changed over a long period of time. For example, as explained previously, the halocline associated with a descending solar pond has a shape which is not stable in the presence of considerable wind mixing at the surface of the pond because of the shallow slope of the halocline near the surface. This profile can be corrected by altering the flow of water into the control chamber.

It is presently estimated that the area of the control chamber with respect to the area of the pond should be approximately 1:100. With this arrangement, the halocline will be stable over extremely long periods of time, permitting the maximum amount of heat to be extracted on a continuous basis by means of a heat exchanger as indicated by reference numeral 73 in FIG. 6.

Another embodiment of a control chamber for maintaining the desired functional relationship between the salinity in the halocline and the depth of the halocline is shown in FIG. 8. Reference numeral 70A designates a solar pond according to the present invention into which control chamber 71A in the form of a flash evaporator is incorporated for the purpose of eliminating the necessity for pumping hot brine between the pond and flash evaporator and for permitting all of the heat which can be taken from the heat storage layer on a steady state basis to be removed from the pond in terms of the latent heat of the water evaporated in the flash evaporator. The significance of these two factors can be appreciated by considering U.S. Pat. No. 3,372,691 which discloses a flash evaporator in combination with a solar pond, but which requires the use of pumps for transferring brine between the pond and the heat exchanger and which will permit only a fraction of the available heat in the heat storage layer to be extracted in terms of the latent heat of the water evaporated in the flash evaporator.

Referring now to FIG. 8, the pond is the same as shown in FIG. 6, and control chamber 71A defines local region 82A which functions to evaporate water from the pond thereby increasing the salinity in the region. Specifically, chamber 71A includes tube 84A vertically positioned in the pond, the lower end of the tube being open at 86 at an elevation below the halocline. The upper end of the tube is closed by cap 88A and a vent 89A in the closed end of the tube provides an exit chamber for water that evaporates from inside the tube. Inside chamber 71A is a vertically disposed baffle 85A which separates inlet 86A from discharge aperture 87A.

Some of the water from mixed layer 74 is returned to the heat storage layer as indicated by line 90. This quantity is designated as q. and is determined by control valve 83A, the setting of which determines the quantity of water discharged from the system $q_d$. Makeup water is furnished via pipe 91, this water being designated $q_{in}$ and is equal to the sum of the water discharged by valve 83A, the quantity of water added to the heat storage layer and the quantity of water $q_e$ evaporated from the pond.

The column of water 92 inside tube 71A is denser than the water in heat storage layer 80. This situation arises because water from heat storage layer enters opening 86 on one side of baffle 85, flows upwardly towards the interface of the vapor and water in tube 71A, and then flows downwardly along the other side of the baffle, finally exiting through opening 87A. The pressure $P_V$ inside the flash evaporator is below atmospheric pressure $P_A$, and as a consequence the water at the surface of the flash evaporator flashes into steam and exits through vent 89A. Because water is constantly being evaporated from column 92, the density of the water passing through exit 87A will be greater than the density of water entering opening 86.

The height of the water in the flash evaporator above the level of the pond is designated h and is determined as follows:

$$h = [1/(g\rho_1)][(P_A - P_V) - (D/\bar{\rho})(\rho_1 - \bar{\rho})] \quad (13)$$

where $\rho_1$ is the density of the water flowing into the flash evaporator, $\bar{\rho}$ is the average density of the pond above the depth D, where D is the distance between the level of the pond and the opening 86A in the flash evaporator, $P_A$ is the atmospheric density in Pascal and P is the vapor pressure inside the flash evaporator.

The difference in density between the liquid leaving the flash evaporator and the liquid entering establishes the flow velocity at the inlet and exit of the flash evaporator. If the density of the outflow of the flash evaporator is $\rho_2$, then the velocities at the inlet and outlet are as follows:

$$V_2 \doteq V_1 = [(2g)(h + D)(\rho_2 - \rho_1)/\rho_2]^{\frac{1}{2}} \quad (14)$$

As discussed above, where the heat flux in the heat storage layer is about 50 watts per square meter of area of the pond, and assuming that all of this heat is taken out in terms of the latent heat of the water evaporated from the flash evaporator, then $q_0 = 2$ Kg/day/m². If it is desired for the discharged water to be about 3 degrees Celsius below the temperature of the water in the flash evaporator, then the quantity q. will be approximately 200 times larger.

In such case, the velocity of the brine entering and leaving the flash evaporator will be approximately 0.4 m/sec. The area of the inlet and outlet apertures in the flash evaporator will be approximately $10^{-5}$ m² for each square meter of the pond. Thus, for a pond that is 10,000 sq.m., the openings should be approximately 0.1 sq.m.

FIG. 8 shows, in schematic form, heat exchanger 93 which extracts the latent heat from the vapor evaporated by the flash evaporator producing at the end, slightly cooler fresh water. The heat exchanger is shown schematically and could represent a process steam line in a manufacturing plant, the exhaust steam being condensed and providing fresh water. This water will generally be valuable in an arid environment so that it would normally not be inserted back into the pond but would provide a useful byproduct of the conversion of heat in the solar pond into process steam for a manufacturing operation.

One of the corollary advantages in the arrangements shown in FIG. 8 lies in the ease with which the vacuum within the flash evaporator can be maintained. This situation arises because the flash evaporator handles hot brine solutions which can contain only a very minute amount of dissolved gases; and this reduces the amount of work required in maintaining the vacuum.

The configuration of the flash evaporator shown in FIG. 8 will eliminate the necessity for pumping hot brine between the pond and the flash evaporator and thus reduce the oveall power requirements of the system. However, the application to the heat storage layer of the quantity of water designated $q_1$ achieves significant results independently of the savings in power to be realized by utilizing the flash evaporator and configuration shown in FIG. 8. These results can be demonstrated by considering curve 103 and curve 104 in FIG. 9. Curve 103 represents a falling solar pond which can be achieved by combining a flash evaporator with a solar pond and evaporating a quantity of water from the flash evaporator that will just be the adequate to maintain the profile of the salinity in the halocline. Where the salinity of the water at the bottom of the halocline is approximately 4 times the salinity of the water at the top of the halocline, curve 103 shows that the ratio $q_0/q^*$ is approximately 0.8. This means that only about 10% of the available energy contained in the water in the heat storage layer can be extracted from the water evaporated from the flash evaporator in terms of its latent heat. The remaining 90% of the heat in the heat storage layer will have to be extracted by a heat exchanger such as indicated at 73A in FIG. 8. In other words, no more than 10% of the available heat in the heat storage layer can be extracted from the latent heat in the water evaporated from the flash evaporator if the halocline is to be maintained. Evaporation of more water than this amount can be accomplished, but only at the expense of degradation in the salinity profile in the halocline. Therefore, this approach is not feasible over a long period of time because the pond will be destroyed. If the pond is to furnish processed steam, for example, at a given rate, the area of the pond will have to be considerably larger than will be the case where all of the heat in the heat storage layer extracted in terms of the latent heat of the water evaporated by the flash evaporator.

Considering now curve 104 which is for standing pond in which the quantity q is greater than zero, a 4 to 1 salinity ratio across the halocline will result in the quantity $q_0/q^*$ having a value of approximately 3. This is approximately a 4-fold increase in the quantity of water that can be extracted by evaporation from the flash evaporator while still maintaining the halocline. Furthermore, the halocline will be a linear one in the case of the standing pond as compared to the concave profile associated with a falling pond.

Consider now curve 101 for an ascending pond where the quantity q is approximately 25% greater than the water evaporated from the flash evaporator. Inspection of the curves in FIG. 9 reveals that the quantity $q_0/q^*$ for this situation is approximately 11 which means that all of the heat in the heat storage layer can be extracted on a steady state basis in terms of the latent heat of the water evaporated from the flash evaporator. Furthermore, as indicated previously, the halocline for an ascending solar pond will be convex in shape which will provide a greater resistance to wind-mixing at the surface.

It is believed that the advantages and improved results furnished by the apparatus of the present invention are apparent from the foregoing description of the several embodiments of the invention. Various changes and modifications may be made without departing from the spirit and scope of the invention as sought to be defined in the claims that follow.

What is claimed is:

1. A method for maintaining a halocline in an open body of salt water at a depth to which a significant amount of solar radiation penetrates, said method comprising the step of inducing an upward vertical flow across the halocline to counter the effects of wind-mixing and molecular diffusion.

2. A method according to claim 1 wherein the upward vertical flow is induced by a circulation that includes a surface liquid concentrate with a density greater than the density of liquid at the lower portion of the halocline.

3. A method according to claim 2 including adding sufficient liquid to the body of water for maintaining the surface thereof at a substantially constant level.

4. A method according to claim 2 including mechanically reducing the effect of wind mixing at the surface of the body.

5. The method of claim 3 wherein the added liquid is brackish water.

6. The method of claim 5 including precipating salts and removing them from the system so as to maintain a substantially constant amount of salt in the system.

7. A method according to claim 6 including the provision of an evaporating pond connected to the body of water for producing said surface liquid concentrate.

8. A method according to claim 7 wherein the precipitated salts are removed from the evaporating pond.

9. The method of claim 7 wherein the precipitated salts are removed by flash evaporating liquid drawn from the body near the lower end of the halocline.

10. A method according to claim 1 including inducing a downward vertical flow that counters the upward vertical flow and establishes a substantially linear salt gradient.

11. A method according to claim 10 wherein the downward vertical flow is introduced by flash evaporating liquid drawn from the body at a depth near the lower end of the halocline.

12. A method according to claim 1 including depositing a mono-molecular layer on the surface of the body of the water for inhibiting evaporation.

13. A method according to claim 12 including mechanically inhibiting the effect of wind mixing at the surface of the body of water.

14. Apparatus comprising:
(a) a halocline adjacent to the surface of a solar pond for absorbing solar radiations;
(b) a heat storage layer below the halocline for absorbing heat produced in the halocline;
(c) means for automatically stabilizing the halocline including means for inducing an upward vertical flow across the halocline.

15. Apparatus according to claim 14 wherein the halocline is below a wind-mixed layer and the means for automatically stabilizing the halocline includes:
(a) a region associated with the pond for evaporating water from the pond to increase the salinity in said region; and
(b) means connecting said region to the pond below the wind-mixed layer.

16. Apparatus according to claim 15 including admission means for admitting water from the pond into the region, and discharge means for discharging salty water into the pond below the wind-mixed layer.

17. Apparatus according to claim 16 wherein the discharge means discharges salty water below the halocline.

18. Apparatus according to claim 16 wherein said region is a relatively shallow evaporating pond, and the admission means admits only surface water.

19. Apparatus according to claim 16 wherein the admission means admits water from below the halocline.

20. Apparatus according to claim 19 wherein said region is defined by a tube vertically positioned in the pond, the lower end of the tube being open at a level below the halocline and constituting the discharge means, and the upper end of the tube being closed and provided with vent means for venting vapor from within the tube.

21. Apparatus according to claim 20 wherein the admission means includes apertures in the tube adjacent to but below the surface of the pond for effecting entry of surface water into the region.

22. Apparatus according to claim 21 wherein the apertures are selectively adjustable to control the flow of surface water into the tube.

23. Apparatus according to claim 20 in which the tube is operated as a flash evaporator with the evaporated water being removed through the vent means.

24. Apparatus according to claim 23 wherein fresher water is added to the heat storage layer, the rate at which such fresher water is added bearing a predetermined relationship to the rate at which water is removed through the vent means.

25. Apparatus according to claim 24 wherein said predetermined rate is substantially equal.

26. Apparatus according to claim 24 wherein makeup water is added to the surface of the pond.

27. Apparatus according to claim 26 wherein sufficient water is removed from the pond to conserve the salt and mass balance of the pond.

28. Apparatus for maintaining a halocline adjacent the surface of an open body of salt water exposed to ambient weather conditions such that the halocline and the layer of liquid in the open body of salt water therebelow are heated by solar radiation to a temperature higher than the surface temperature of the body comprising:
(a) an evaporating pond adjacent the body of water;
(b) means to effect transfer of surface liquid from the body to the pond for forming a concentrate with a density greater than the density of liquid in the body at the lower end of the halocline; and
(c) means to inject the concentrate into the body of water for inducing upwelling in the body that counters the effects of molecular diffusion of salt across the halocline.

29. Apparatus according to claim 28 including heat utilization means, and means to transfer heat from said liquid to the heat utilization means.

30. Apparatus according to claim 29 including means for adding liquid to the body for maintaining the surface thereof at a substantially constant level.

31. Apparatus according to claim 29 wherein the heat utilization means includes a flash evaporator.

32. Apparatus according to claim 30 wherein the additional liquid is brackish water.

33. Apparatus according to claim 31 including removing salts that precipitate to maintain a substantially constant amount of salt in the system.

34. Apparatus according to claim 28 including means for reducing the effect of wind mixing at the surface of the body of water.

35. Apparatus according to claim 34 including means for retarding evaporation.

36. Apparatus according to claim 28 including a heat engine, means to transfer heat from the heated liquid below the halocline to the heat engine, and means to reject heat from the heat engine into the hypolimnion below the heted liquid.

* * * * *

UNITED STATES PATENT AND TRADEMARK OFFICE
CERTIFICATE OF CORRECTION

PATENT NO. : 4,440,148
DATED : April 3, 1984
INVENTOR(S) : Gad ASSAF

It is certified that error appears in the above-identified patent and that said Letters Patent is hereby corrected as shown below:

Col. 1, line 5 (after the caption "METHOD OF AND MEANS FOR MAINTAINING A HALOCLINE IN AN OPEN BODY OF SALT WATER") insert:
---This application is a continuation-in-part of copending application Ser. No. 828,190 filed August 26, 1977 (now abandonded).---

Signed and Sealed this

Second Day of August, 1988

Attest:

DONALD J. QUIGG

*Attesting Officer*    *Commissioner of Patents and Trademarks*